United States Patent Office 3,411,490
Patented Nov. 19, 1968

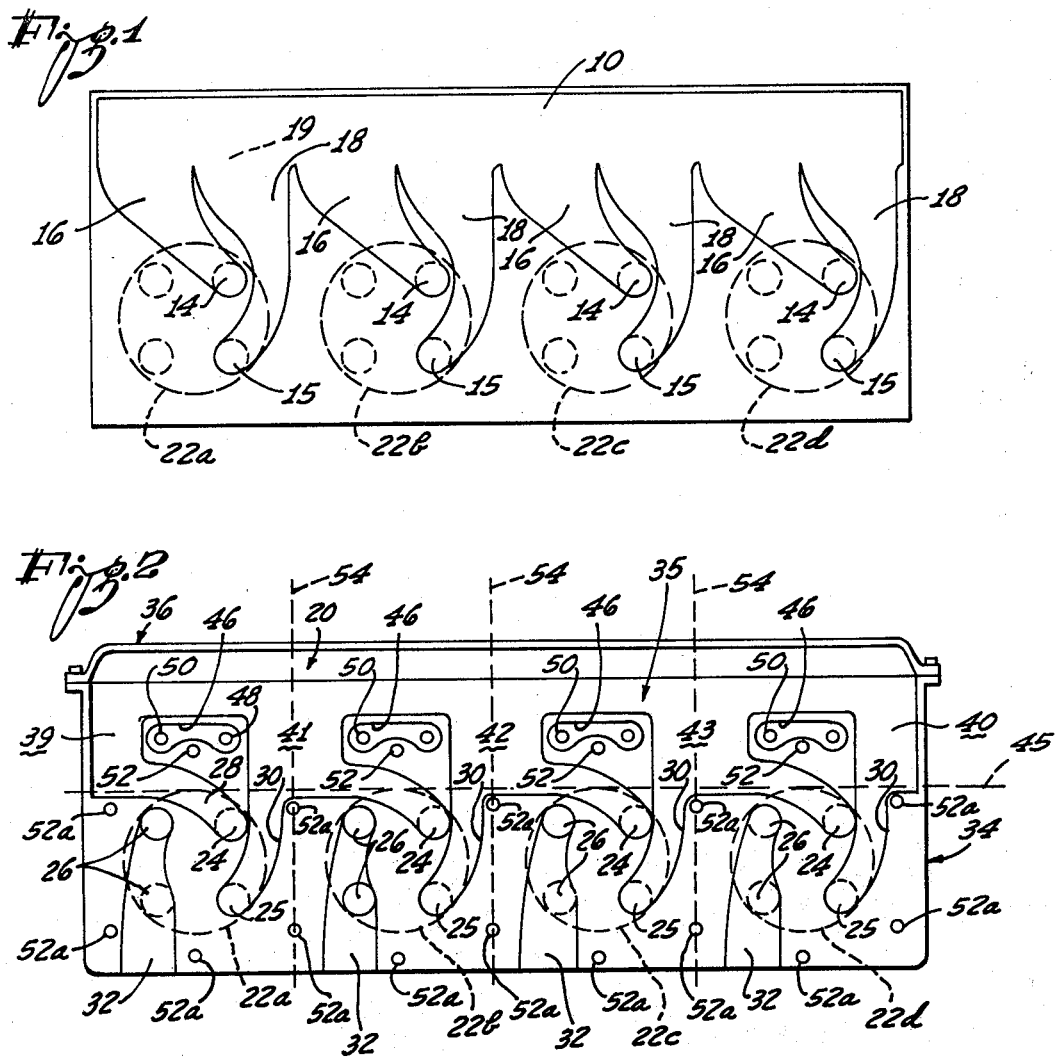

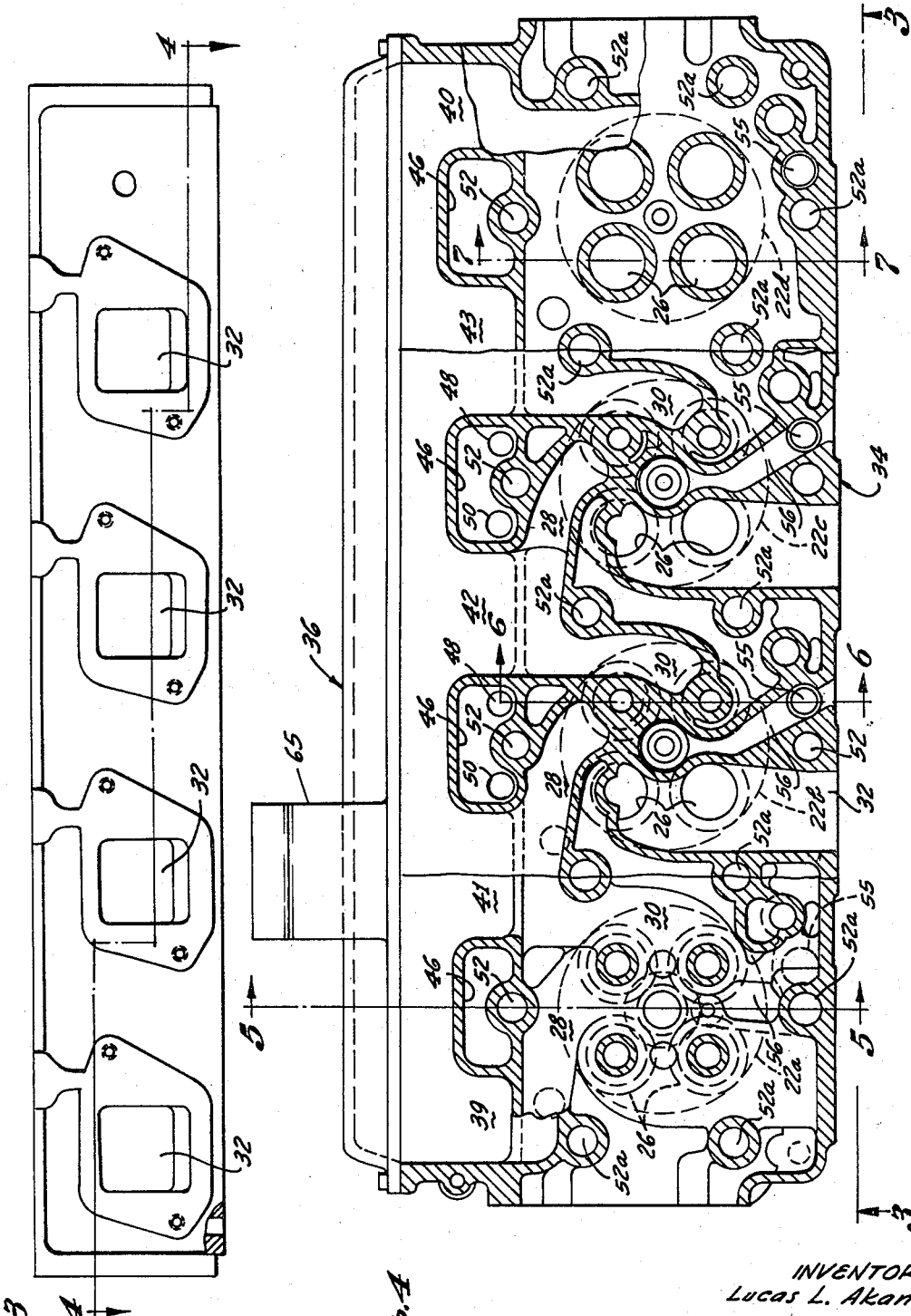

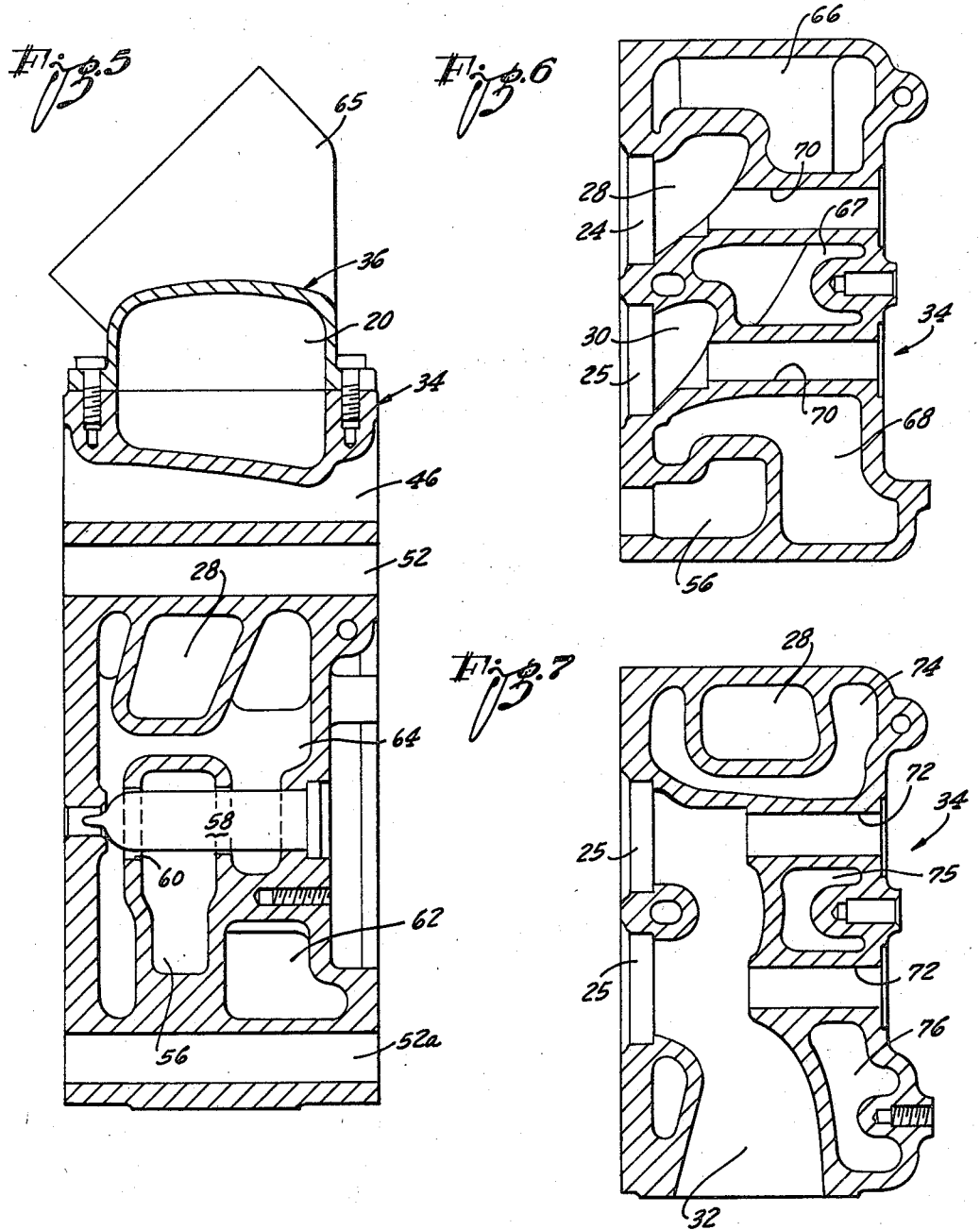

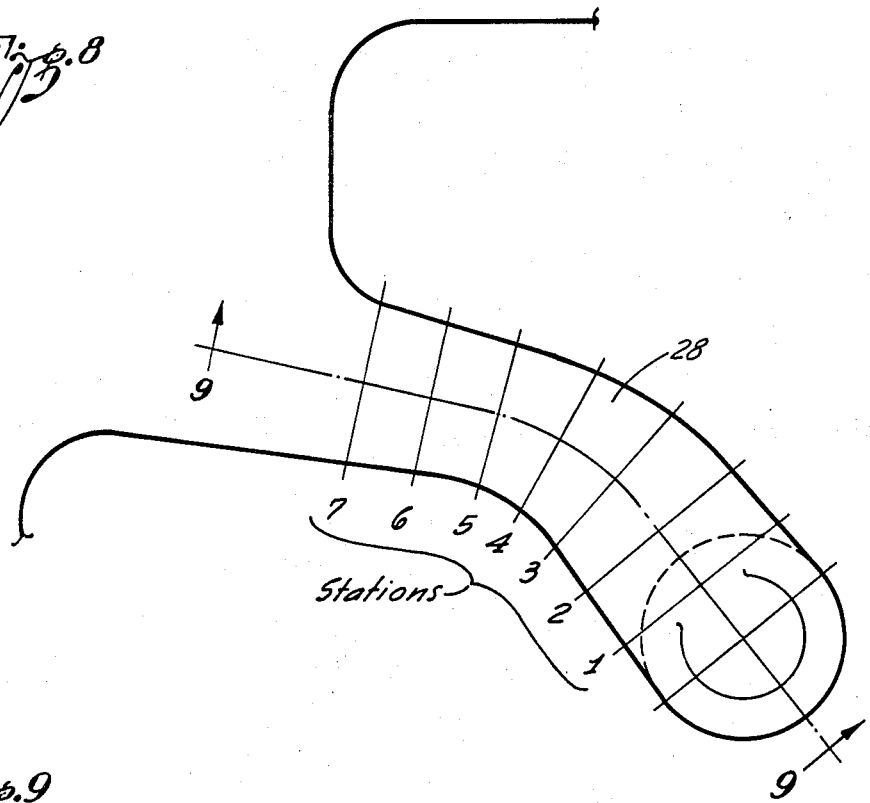
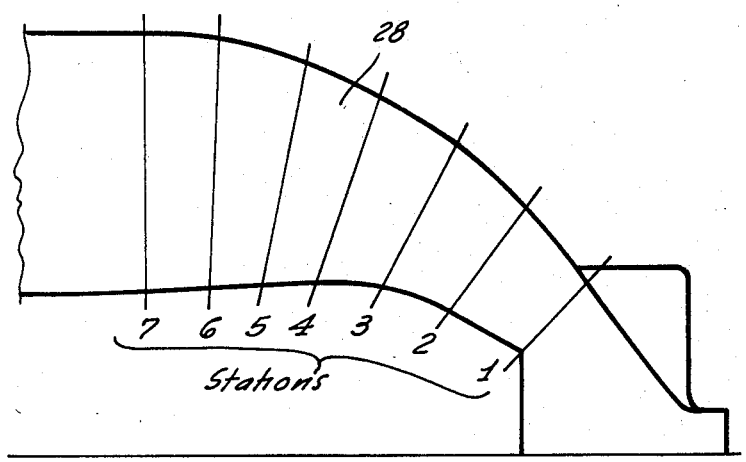

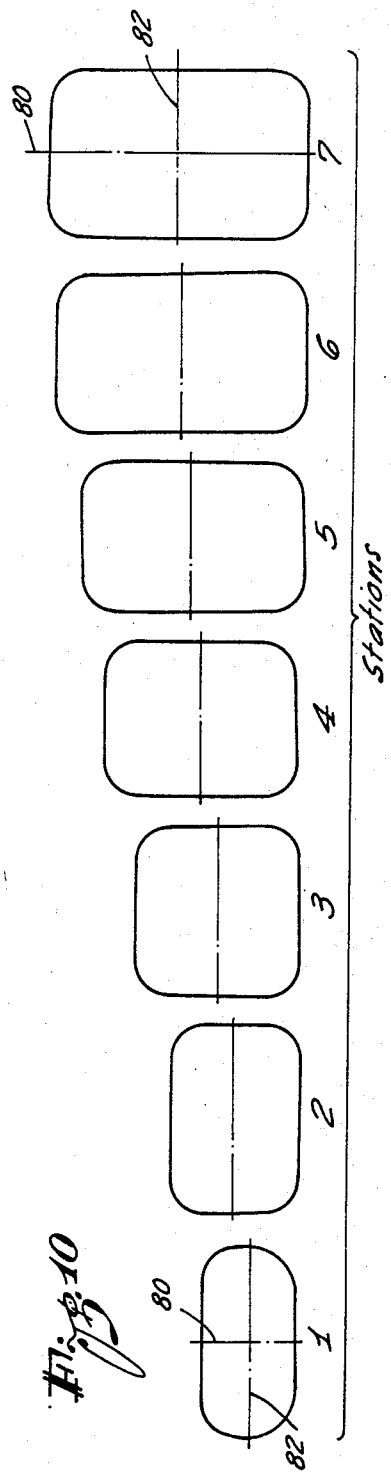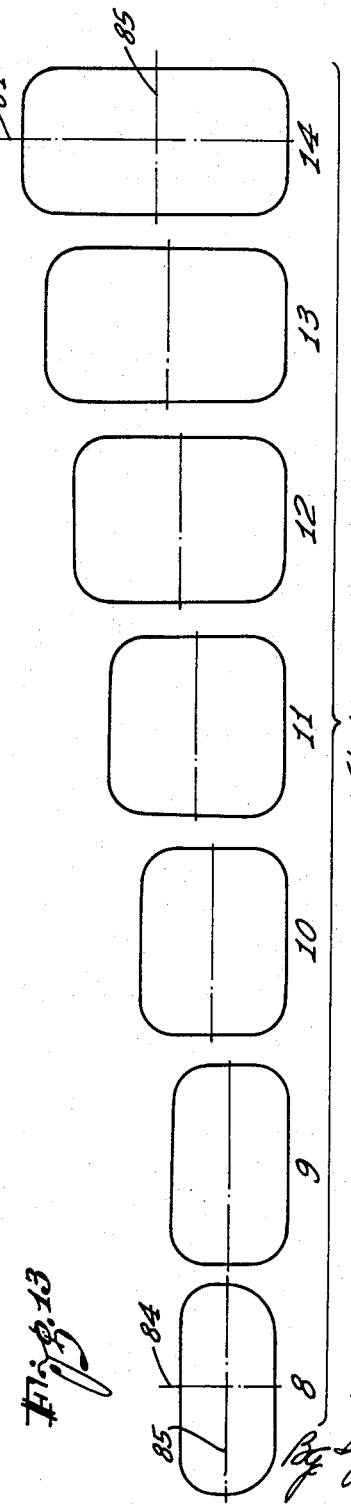

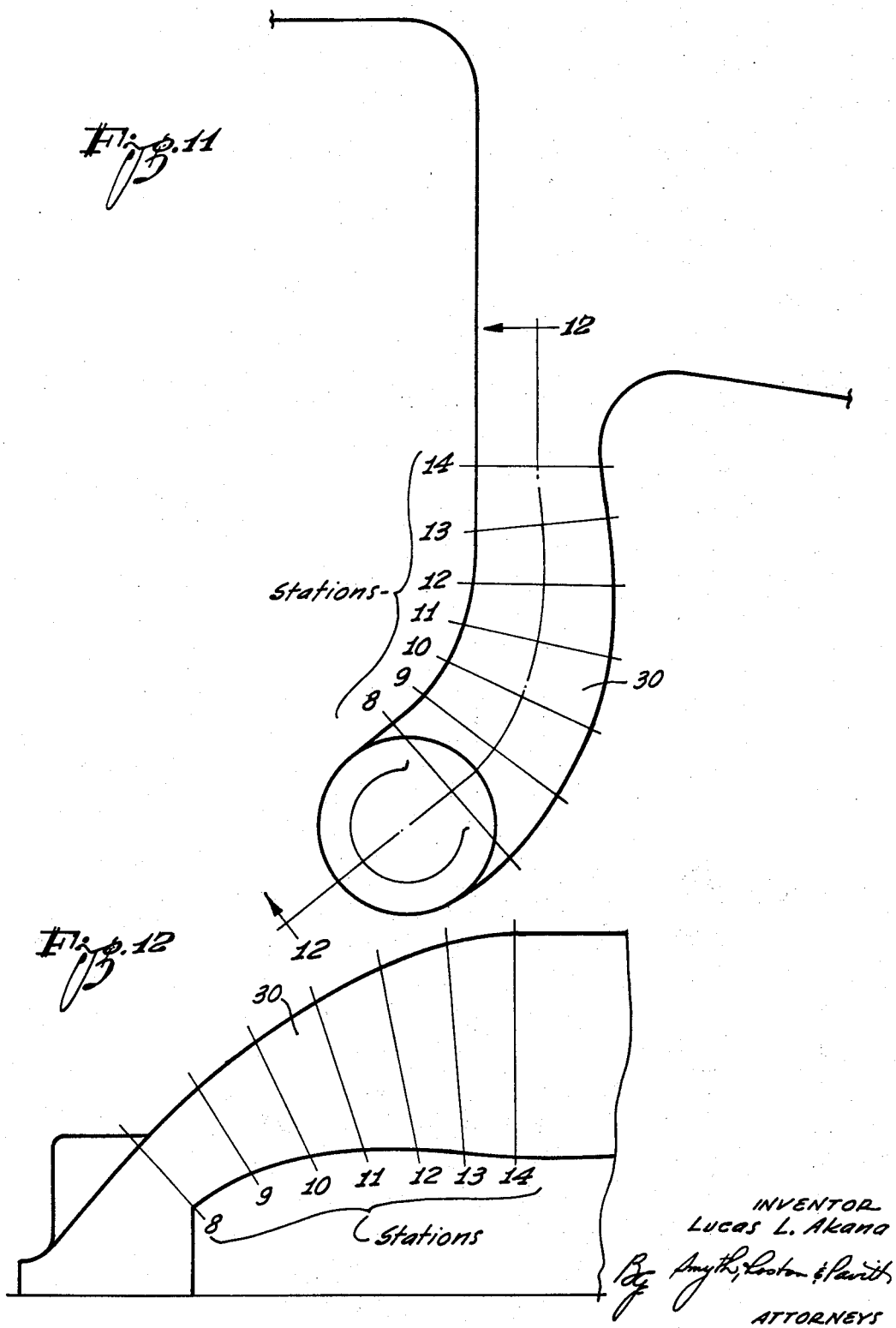

3,411,490
INTAKE PORT STRUCTURE FOR INTERNAL COMBUSTION ENGINE
Lucas L. Akana, Torrance, Calif., assignor to White Motor Corporation, Cleveland, Ohio, a corporation of Ohio
Filed Dec. 9, 1966, Ser. No. 600,629
18 Claims. (Cl. 123—193)

ABSTRACT OF THE DISCLOSURE

The cylinder head of an internal combustion engine is recessed to form one side of an exhaust manifold and is further recessed in spaced regions to form plenum bays of the intake manifold that are much broader than the intake passages to the cylinders. The plenum bays are separated by islands that accommodate push tubes for the intake and exhaust valves. Each cylinder has two intake passages from two different plenum bays to result in a high volume of intake flow to each cylinder.

---

This invention relates to internal combustion reciprocating piston engines and, more particularly, relates to the construction of a cylinder head and of an associated intake manifold which together provide an improved intake porting structure. While the invention is broadly applicable for its purpose, it has special utility for a V-8 type engine in which each cylinder has two intake ports and, by way of example, the present disclosure is directed to such an engine.

The objective in designing an intake structure for such a multiple cylinder engine is to get enough working fluid into each cylinder within an exceedingly brief time period with a velocity and pattern of flow for maximum combustion efficiency. Where each cylinder is provided with two intake ports, it is beneficial to balance or equalize the flow through the two ports.

In practice there is a pressing need for greater utilization of the capacity of an intake manifold, or more specifically, need for greater access to the interior of the intake manifold on the part of the various intake passages and need for freer flow through the intake passages themselves. In addition to meeting these needs it is highly desirable at the same time to reduce both the weight and the cost of fabrication of such an intake system as well as to reduce the space required for the combined intake manifold and cylinder head that provide the intake system.

As will be more fully explained with the aid of diagrams, the invention teaches a number of features that work together to meet these needs for improvement. Included are two provisions for shifting the intake manifold towards the row of cylinders to reduce the length of the intake passages as well as to simplify the problem of balancing the flow through two intake passages to each cylinder. A further important provision is arranging for the two intake passages of each cylinder to draw working fluid from two spaced regions of the intake manifold for a greatly improved flow from the interior of the manifold to the cylinders. In addition the invention teaches specific intake passage configurations that contribute to efficient supply of the working fluid to the cylinders and are additionally conducive to effective flow patterns within the cylinders for high combustion efficiency.

The features and advantages of the invention may be understood from the following description together with the accompanying drawings.

In the drawings, which are to be regarded as merely illustrative:

FIG. 1 is a diagrammatic view to explain the basic problem;

FIG. 2 is a similar diagrammatic view showing how the invention solves the basic problem;

FIG. 3 is a side elevation of a cylinder head that is employed in the presently preferred practice of the invention;

FIG. 4 is a longitudinal sectional view of the cylinder head with the section taken at different levels as indicated by the stepped line 4—4 of FIG. 3;

FIGS. 5, 6 and 7 are transverse sections taken as indicated by the lines 5—5, 6—6 and 7—7 respectively of FIG. 4;

FIG. 8 is a plan view of one of the two intake passages for each cylinder;

FIG. 9 is a section taken along the line 9—9 of FIG. 8;

FIG. 10 shows a series of transverse sections of the intake passage taken at the seven stations indicated in FIGS. 8 and 9;

FIG. 11 is a diagrammatic plan view of the other of the two intake passages for each cylinder;

FIG. 12 is a longitudinal section taken along the line 12—12 of FIG. 11; and

FIG. 13 shows a series of transverse sections of the second intake passage taken at the seven stations indicated in FIGS. 11 and 12.

The diagram in FIG. 1 is hypothetical to serve solely to explain the basic problem and for this purpose the diagram represents in a general way one half of the upper portion of a V-8 engine in which an intake manifold 10 extends parallel to a row of four cylinders 22. In this example, each cylinder 22 has two intake ports, namely, a first intake port 14 and a second intake port 15 with a corresponding first intake passage 16 and a corresponding second intake passage 18. The two intake ports 14 and 15 for each cylinder are located on a line 19 that is perpendicular to the axis of the exhaust manifold to simplify the problem of providing mechanism for operating the two intake valves simultaneously.

If the sole consideration were maximum freedom for flow from the intake manifold 10 to the four cylinders, the intake passages 16 and 18 might well be of the hypothetical configuration shown in FIG. 1 where the two intake passages for each of the four cylinders are open to ¼ of the length of the intake manifold for maximum access to the working fluid that is available in the manifold.

The configurations for the intake passages 16 and 18 shown in FIG. 1 are entirely unacceptable, however, for a number of good reasons. In the first place compartments must be provided to accommodate push tubes for actuating the intake and exhaust valves, but the passage arrangement shown in FIG. 1 leaves no room for such compartments. In the second place, the intake passages are relatively long with consequent excessive friction loss and pressure drop. In the third place, it is obvious that the resistances to flow through the two passages 16 and 18 are unequal with the consequence that the flow to the two intake ports would be grossly out of balance.

With this background in mind, FIG. 2 shows in a simplified manner how the present invention meets the need for ample intake of the working fluid and at the same time not only reserves space for the push tubes but also reduces the width, weight and cost of the required physical structure for the intake system.

In FIG. 2 an intake manifold, generally designated 20, extends parallel to four cylinders 22a–22d, each of which has a first intake port 24, a second intake port 25 and two exhaust ports 26. Each of the two intake ports 24 and 25 is positioned substantially tangentially of the inner circumference of the cylinder. A first intake passage 28 supplies air to the first intake port 24 from the intake manifold 20, a second intake passage 30 supplies air to the second intake port 25 from the intake manifold and an exhaust passage 32 connects the two exhaust ports 25 of each cylinder with an exhaust manifold (not shown). As will now be explained in detail, FIG. 2 incorporates a number of important improvements which cooperate to achieve the objectives of the invention.

The first improvement represented by FIG. 2 in comparison with FIG. 1 is the shifting of the intake manifold laterally towards the row of cylinders to shorten the distance from the intake manifold to the two intake ports 24 and 25 of each cylinder. For this purpose, the cylinder head, which is generally designated 34 in FIG. 2, is formed along one side with a longitudinal recess 35 which recess constitutes a longitudinal portion of the intake manifold 20. The remaining longitudinal portion of the intake manifold 20 is formed by a separate cover 36 which is mounted on the side of the cylinder head 34. In effect, the intake manifold 20, which is usually a separate duct assembly, is shifted laterally partially into the configuration of the cylinder head 34.

One result of shifting the location of the intake manifold is, of course, reducing the distance of the intake manifold from the row of cylinders to permit substantial reduction in the length of the intake passages to the two intake ports of each cylinder. Another advantage is reduction in overall weight since the cover 36 is of substantially less weight than a conventional intake manifold and especially so if the cover is made of a light metal such as aluminum. Another advantage of the new arrangement is that the combined intake manifold and cylinder head is reduced to a smaller package than usual.

Another advantage is reduction in the cost of fabricating the intake manifold and the cylinder head. The reduced cost results in part from the feasibility of using intake passage cores to form portions of the intake manifold. Thus the invention eliminates the usual cored intake manifold. Further cost reduction results from the feasibilty of producing the manifold cover 36 by a die casting technique.

A still further advantage is found in the fact that in a V-8 engine, the lateral shifting of the two intake manifolds away from each other greatly increases the width of the longitudinal space between the two halves of the engine to provide more room for components and accessories.

The second improvement to be found in FIG. 2 is the forming of the intake manifold 20 with longitudinally spaced plenum bays. In a cylinder head for a row of N number of cylinders, there are N+1 plenum bays. In this instance where there are four cylinders, there are five plenum bays comprising two endmost plenum bays 39 and 40 and three remaining intermediate plenum bays 41, 42 and 43. Each of the five plenum bays is shaped and dimensioned for the same freedom for the working fluid to flow and maneuver therein as in the intake manifold proper.

One advantage of this second improvement is that the provision of the plenum bays, in effect, shifts the intake manifold still closer to the row of cylinders 22. In fact the plenum bays reach to a broken line 45 that is tangential to the near sides of the four cylinders. Another advantage of providing the plenum bays is that they permit changes in direction of the flow of the working fluid at substantially no cost in added resistance to flow. It is to be noted in FIG. 2 that fluid flowing longitudinally of the intake manifold 20 must make one 90° turn to enter an intake passage 30 and the fluid must make two 90° turns to enter an intake passage 28. It has been found that the working fluid enters both of the intake passages 28 and 30 with equal freedom, there being no penalty for the additional 90° turn in the direction of fluid flow into the intake passage 28.

A third improvement shown in FIG. 2 is that the five plenum bays are so located that the four spaces between the bays are directly opposite the four cylinders 22 respectively so that these four spaces may be occupied by four corresponding compartments 46 to accommodate push tubes 48 for actuating the intake valves and push tubes 50 to actuate the exhaust valves. In a well known manner, each push tube actuates a corresponding rocker arm (not shown) which in turn actuates a bridge piece (not shown) that spans a pair of the valves.

One advantage of this arrangement is that single walls of metal separate the push tubes from the intake manifold. In contrast, when the push tubes are spaced substantially from an intake manifold, two walls are required to isolate each pair of push tubes from the fluid in the intake manifold, one wall being the wall of the intake manifold proper and the other wall being the wall of the push tube compartment. The substitution of a single wall for a double wall reduces weight and cost. Another advantage is that the walls that form the push tube compartments 46 also form portions of the five plenum bays.

Still another advantage is that the wall structure of each of the push tube compartments 46 may be formed with a bore 52 to accommodate a bolt or stud for anchoring the cylinder head to the cylinder block (not shown). In this regard, a feature of the invention is that the provision of the row of four bores 52 for anchorage of the cylinder head makes possible a highly satisfactory symmetrical arrangement of bores for this purpose. Thus FIG. 2 shows three additional longitudinal rows of bores 52a.

A fourth improvement of primary importance in FIG. 2 is the placing of the intake passages 28 and 30 of each cylinder in communication with two different plenum bays of the intake manifold. Since each plenum bay serves two cylinders, each plenum bay is located midway between two cylinders. Thus each of the intermediate plenum bays 41, 42 and 43 intersects a transverse line 54 that is midway between two of the cylinders.

One important advantage of this arrangement is that the two intake passages for each cylinder draw working fluid from two different portions of the intake manifold that are spaced apart longitudinally of the manifold by a substantial distance. Thus in FIG. 2 the two intake passages for cylinder 22b communicate respectively with the two plenum bays 41 and 42 with no competition between the two intake passages. In contrast, in FIG. 1 where the entrances to the two intake passages are intermediately adjacent each other, the two intake passages compete for working fluid from the intake manifold with undesirable interaction between the two intake passages and consequent turbulence.

A fifth improvement is making the various plenum bays of ample length measured longitudinally of the exhaust manifold to give each intake passage ample access to the working fluid in the intake manifold. In this particular embodiment of the invention, the sum of the lengths of the plenum bays is substantially equal to the sum of the lengths of the push tube compartments 46 that separate the plenum bays. Thus the five plenum bays 39–43 occupy approximately one half of the length of the intake manifold.

The extent to which this arrangement gives each cylinder access to the working fluid in the intake manifold may be appreciated by considering cylinder 22b, for example. This cylinder communicates with the two plenum bays 41 and 42 and the combined length of these two bays is equal to one-fourth of the length of the intake manifold to give the cylinder access to its full share of the length of the intake manifold just as in FIG. 1. Thus the invention provides room for the four push tube chambers 46 and does so actually without correspondingly reducing the portion of the intake manifold that is available for each cylinder. This surprising result is explained by the fact that each of the three relatively long plenum bays 41, 42 and 43 is used in turn by two different cylinders with an intervening time interval sufficient to eliminate any conflict between the demands of the two cylinders.

A sixth improvement is in the concept of so locating, shaping and dimensioning the three plenum bays 41, 42 and 43 that the distance along a curved path from one end of the plenum bay to an intake port of one cylinder is equal to the distance along a curved path from the outer side of the plenum bay adjacent the opposite end of the plenum bay to an intake port of a second cylinder. In other words each of the five plenum bays is so located, shaped and dimensioned that the two intake passages to each cylinder are equal. With the two intake passages of equal length and with the two intake passages shaped and dimensioned for equal resistance to fluid flow, the result is balanced supply of working fluid to the two intake ports of each cylinder.

It is apparent that the lateral shifting of the intake manifold towards the row of cylinders and the further provision of relatively large plenum bays protruding towards the row of cylinders greatly reduces the area in plan of the cylinder head that is available for the four pairs of intake passages. The problem of finding adequate room for the intake passages is further complicated by the fact that each of the intake passages is progressively reduced in cross-sectional area from a necessarily large cross-sectional area at the entrance of the intake passage. Bearing in mind that the two intake passages of each cylinder must be balanced, it is apparent that as the cylinder head is viewed in plan in FIG. 2, there is very little room to widen the entrances of the two intake passages. This problem is met by a further improvement which, as will be explained, resides in configurations of the intake passages to minimize the area in plan of the passages.

Turning now to the specific structure of the presently preferred embodiment of the invention, FIG. 3 is a side elevation of the cylinder head looking into the four exhaust passages 32 and FIG. 4 is a sectional view taken at the different levels indicated by the line 4—4 in FIG. 3. It can be seen that FIG. 4 is an elaboration of the diagrammatic view in FIG. 2 with corresponding parts indicated by corresponding numerals.

Cooling water for the region of each of the four cylinders 22 is supplied through four corresponding ports 55 and flows to the axis of each cylinder through a corresponding water passage 56. As shown in section in FIG. 5, the water supplied through each of the four passages 56 envelops a fuel injector 58 that is concentric to the corresponding cylinder. The water flows downward around each fuel injector through an annular clearance space 60 to return to the radiator through the labyrinth interior of the cylinder head.

FIG. 5 shows a section of one of the intake passages 28 and further shows spaces 62 and 64 in the labyrinth interior of the cylinder head through which the return water flows. FIG. 5 further shows the manifold cover 36 as well as a portion of an intake duct 65 that supplies the working fluid to the intake manifold. FIG. 5 also shows a section of a push tube compartment 46 and longitudinal sections of two bores 52 and 52a to accommodate means for anchoring the cylinder head to the cylinder block.

FIG. 6 shows a portion of an intake passage 28 leading to an intake port 24, a portion of an intake passage 30 leading to an intake port 25, and a portion of a water passage 56. FIG. 6 further shows three spaces 66, 67 and 68 in the interior of the cylinder head through which return water flows and further shows two bores 70 for the stems of the two intake valves (not shown).

FIG. 7 shows a section of an exhaust passage 32 from two exhaust ports 25, two bores 72 for the stems of two exhaust valves (not shown) and a portion of an intake passage 28. Also shown in FIG. 7 are three spaces 74, 75 and 76 in the interior of the cylinder head for return water flow.

FIG. 8 shows the configuration in plan of one of the four identical intake passages 28; FIG. 9 is a developed section along the longitudinal axis of the passage as indicated by the line 9—9 of FIG. 8; and FIG. 10 shows cross sections of the interior of the passage taken at stations designated 1 to 7 in FIGS. 8 and 9. The seven sections shown in FIG. 10 are progressively reduced in cross-sectional area and each cross section is of the general configuration of a rectangle with rounded corners. At station 7 near the intake end of an intake passage the major axis is what may be termed the depth axis 80 which is perpendicular to the plane of the bottom of the cylinder head. In this embodiment of the invention, the depth axis 80 at station 7 near the inlet end of the intake passage is at least approximately twice the dimension of what may be termed the width axis 82. On the other hand, at station 1 near the intake port, the width axis 82 is the major axis and is at least approximately twice the dimension of the depth axis 80 to flatten the stream of working fluid that is projected into the cylinder. Thus at some station in the region of station 3, the two axes 80 and 82 are equal and beyond that point the major axis is rotated 90°. The progressive reduction in cross-sectional area results in progressive increase in velocity to a maximum at the throat of the passage at station 1 where the working fluid is injected into the cylinder at an angle approaching 45° from the plane of the bottom wall of the cylinder head.

In like manner, FIG. 11 is a plan view of one of the four identical intake passages 30; FIG. 12 is a developed section along the longitudinal axis of the intake passage indicated by line 12—12 in FIG. 11; and FIG. 13 shows the generally rectangular cross sections of the interior of the passage taken at stations designated 8 to 14 in FIGS. 11 and 12. Here again, at an intermediate station in the region of station 11, the two cross sectional axes are equal and beyond station 11 towards station 8, the major cross-sectional axis is rotated 90°. The depth axis 84 at station 14 is on the order of twice the dimension of the width axis 85 and at station 8 the width axis 85 is more than twice the dimension of the elevation axis 84. Here again, a flattened stream of working fluid is projected into the cylinder at an angle approaching 45° from the plane of the bottom of the cylinder head.

It has been found that with the two intake passages for each cylinder shaped and dimensioned as described, the resistances to fluid flow through the two passages are substantially equal. The fluid streams through the two intake passages are substantially equally accelerated to result in balanced intake flow in each cylinder and to result in greater combustion efficiency than in the prior art 4-valve cylinders.

The fact that the intake passages are relatively narrow as viewed in plan solves the problem of finding room for the intake passages in the space of the cylinder head that is crowded by the intrusion of the plenum bays and by the intrusion of a longitudinal portion of the intake manifold. It is a striking fact that the inlet ends of the intake passages where their cross-sections are maximum, are actually narrower in plan than the discharge ends at the intake ports of the cylinders.

My description in specific detail of the presently preferred embodiment of the invention will suggest various changes, substitutions and other departures from my disclosure within the spirit and scope of the appended claims.

I claim:

1. In an internal combustion engine having a cylinder head covering a row of cylinders and having an intake manifold extending longitudinally of the row with the cylinder head providing two intake passages from the intake manifold to each cylinder, the improvement comprising:
the intake manifold having plenum bays spaced apart longitudinally of the manifold and extending laterally of the manifold towards the row of cylinders to shorten the distance from the manifold to the cylinders;

said plenum bays being separated by compartments of the cylinder head corresponding to the different cylinders to accommodate means to operate the valves of the cylinders;

one intake passage for each cylinder extending from a manifold plenum bay adjacent one end of the compartment corresponding to the cylinder; and the other intake passage for the cylinder extending from the manifold plenum bay adjacent the other end of the same compartment whereby each cylinder draws gaseous fluid from two regions of the intake manifold spaced apart by one of said compartments with each plenum bay except the two end-most plenum bays supplying gaseous fluid through two intake passages to two cylinders at different times whereby the whole flow capacity of two of the plenum bays is available to each cylinder in its turn.

2. An improvement as set forth in claim 1 in which the total dimension of the plenum bays measured longitudinally of the manifold is at least approximately equal to half of the length of the manifold, the portion of the length of the manifold available to each cylinder in its turn equaling approximately the length of the manifold divided by the number of cylinders.

3. An improvement as set forth in claim 1 in which the cylinder head is recessed adjacent each of the said compartments to receive means for anchoring the cylinder head to the cylinder block.

4. An improvement as set forth in claim 1 in which each of said plenum bays except the two endmost plenum bays is elongated longitudinally of the manifold with one intake passage extending from one end of the plenum bay and the other intake passage extending from the longitudinal side of the plenum bay adjacent the other end of the plenum bay.

5. An improvement as set forth in claim 1 in which the plenum bays extend towards the row of cylinders at least approximately to a line tangential to the cylinders of the row.

6. In an internal combustion engine having a cylinder head covering a row of cylinders and having an intake manifold extending longitudinally of the row with the cylinder head providing at least one intake passage for each cylinder, the improvement to save space and weight, comprising:

one longitudinal side of the cylinder head having a longitudinal recess to form a longitudinal portion of the intake manifold to reduce the distance from the intake manifold to the row of cylinders;

said longitudinal recess of the cylinder head being further recessed in longitudinally spaced regions thereof to form plenum bays for further reduction of the distance from the intake manifold to the row of cylinders, said intake passages extending from the plenum bays to the cylinders, the plenum bays being substantially wider than the intake passages; and a separate cover for said longitudinal recess of the cylinder head, said cover forming the remaining longitudinal portion of the intake manifold.

7. An improvement as set forth in claim 6 in which the plenum bays are separated by compartments to accommodate valve push tubes, said compartments being separated from the intake manifold by single walls.

8. An improvement as set forth in claim 7 in which said cylinder head has a plurality of longitudinal rows of recesses for fastening means to anchor the cylinder head to the cylinder block one of said rows comprising recesses adjacent each of said chambers.

9. In an internal combustion engine having a cylinder head covering a row of N number of cylinders and having an intake manifold extending longitudinally of the row with the cylinder head providing two intake passages for each cylinder, the improvement comprising:

the intake manifold having $N+1$ plenum bays spaced apart longitudinally of the manifold and projecting laterally of the manifold towards the row of cylinders to shorten the distance between the manifold and the cylinders, each of said plenum bays being dimensioned for substantially the same freedom for gaseous flow therein as in the intake manifold proper;

an intake passage from each of the two endmost plenum bays extending to an intake port of the corresponding endmost cylinder;

a first intake passage extending from each of the remaining plenum bays to an intake port of a cylinder adjacent the plenum bay;

a second intake passage extending from each of said remaining plenum bays to an intake port of another cylinder adjacent the plenum bay;

all of said intake passages being of progressively reduced cross section; and the lengths of all of said intake passages and the pressure drops therein being substantially equal.

10. An improvement as set forth in claim 9 in which each of said remaining plenum chambers lies on a transverse line midway between two cylinders with said first and second intake passages lying on opposite sides of the line.

11. In an internal combustion engine having a cylinder head covering a row of N number of cylinders and having an intake manifold extending longitudinally of the row with the cylinder head providing two intake passages from the manifold for each cylinder, the improvement comprising:

the intake manifold having $N+1$ lateral openings on the side towards the row of cylinders with the lateral openings spaced substantially apart longitudinally of the manifold;

an intake passage from each of the two endmost lateral openings of the intake manifold extending to the corresponding endmost cylinder of the row;

a first intake passage extending from each of the remaining lateral openings of the intake manifold to one cylinder of the row; and a second intake passage extending from each of said remaining lateral openings of the intake passage to another cylinder of the row whereby each of said cylinders draws working fluid from two of said transverse openings simultaneously.

12. An improvement as set forth in claim 11 in which said cylinder head has a longitudinal recess on one of its longitudinal sides forming a longitudinal portion of the intake manifold to reduce the distance between the intake manifold and the row of cylinders.

13. An improvement as set forth in claim 11 in which the total dimension of said lateral openings measured longitudinally of the intake manifold is at least approximately equal to one half of the length of the manifold with each cylinder having access to a portion of the length of the intake manifold at least approximately equal to the length of the intake manifold divided by N.

14. An improvement as set forth in claim 11 in which said cylinder head has a plurality of longitudinal rows of recesses for fastening means to anchor the cylinder head to the cylinder block one of said rows comprising recesses each of which is located adjacent the intake manifold between two of the lateral openings of the intake manifold.

15. In an internal combustion engine having a cylinder head covering a row of cylinders and having an intake manifold extending longitudinally of the row with the cylinder head providing two intake passages for each cylinder, the improvement comprising:

at least a portion of the intake manifold lying within the configuration of the cylinder head to reduce the distance from the intake manifold to the row of cylinders with consequent reduction of the area of the cylinder head available for the intake passages;

said intake passages being of relatively small width at their entrance ends to fit into the reduced area of the cylinder head;

said intake passages being of relatively large depth dimension at stations near their inlet ends for large entrance capacity;

said intake passages being of progressively reduced cross-sectional area for high acceleraation of the working fluid; and said intake passages at stations near their outlet ends being of greater dimension in width than in depth to flatten the streams of working fluid as the streams enter the cylinders.

16. An improvement as set forth in claim 15 in which the intake manifold is further formed with plenum bays projecting towards the row of cylinders to further shorten the distance from the intake manifold to the row of cylinders with consequent further reduction of the area of the cylinder head available for the intake passages.

17. An improvement as set forth in claim 15 in which the cross sections of the intake passages are of the general configuration of a rectangle with rounded corners.

18. In an internal combustion engine having a cylinder head covering a row of cylinders and having an intake manifold extending longitudinally of the row with the cylinder head providing intake passages from the intake manifold to the cylinders, the improvement comprising said intake passages having the following features:

the cross sectional area of each intake passage progressively decreasing from the intake end to the discharge end of the passage;

cross sections of each intake passage at spaced stations along the length of the passage being of the general configuration of a rectangle with rounded corners;

the depth dimension of the cross sections at the stations of each intake passage progressively decreasing towards the discharge end of the intake passage;

the width dimension of the cross sections at the stations of each intake passage progressively increasing towards the discharge end of the intake passage;

the depth dimension of the cross sections at the stations near the intake end of each intake passage being substantially greater than the width dimension;

the width dimension of the cross sections at the stations near the discharge end of the intake passage being substantially greater than the depth dimension;

the width dimension and the depth dimension at an intermediate station of each intake passage being substantially equal; and said intake passages at their discharge ends following the curvature of the corresponding cylinder walls and being inclined at acute angles relative to the plane of the bottom of the cylinder head.

References Cited

UNITED STATES PATENTS

| | | | |
|---|---|---|---|
| 2,230,740 | 2/1941 | Birkigt | 123—75 |
| 3,060,914 | 10/1962 | Morand | 123—52 |
| 3,125,075 | 3/1964 | Wittek | 123—188 XR |
| 3,331,359 | 7/1967 | Skatsche | 123—75 |

FOREIGN PATENTS

| | | |
|---|---|---|
| 1,192,664 | 4/1959 | France. |
| 1,368,394 | 6/1964 | France. |
| 839,945 | 6/1960 | Great Britain. |
| 938,887 | 10/1963 | Great Britain. |

OTHER REFERENCES

Society of Automotive Engineers Journal, May 1959, vol. 67, No. 5, pp. 66, 67.

WENDELL E. BURNS, *Primary Examiner.*